UNITED STATES PATENT OFFICE.

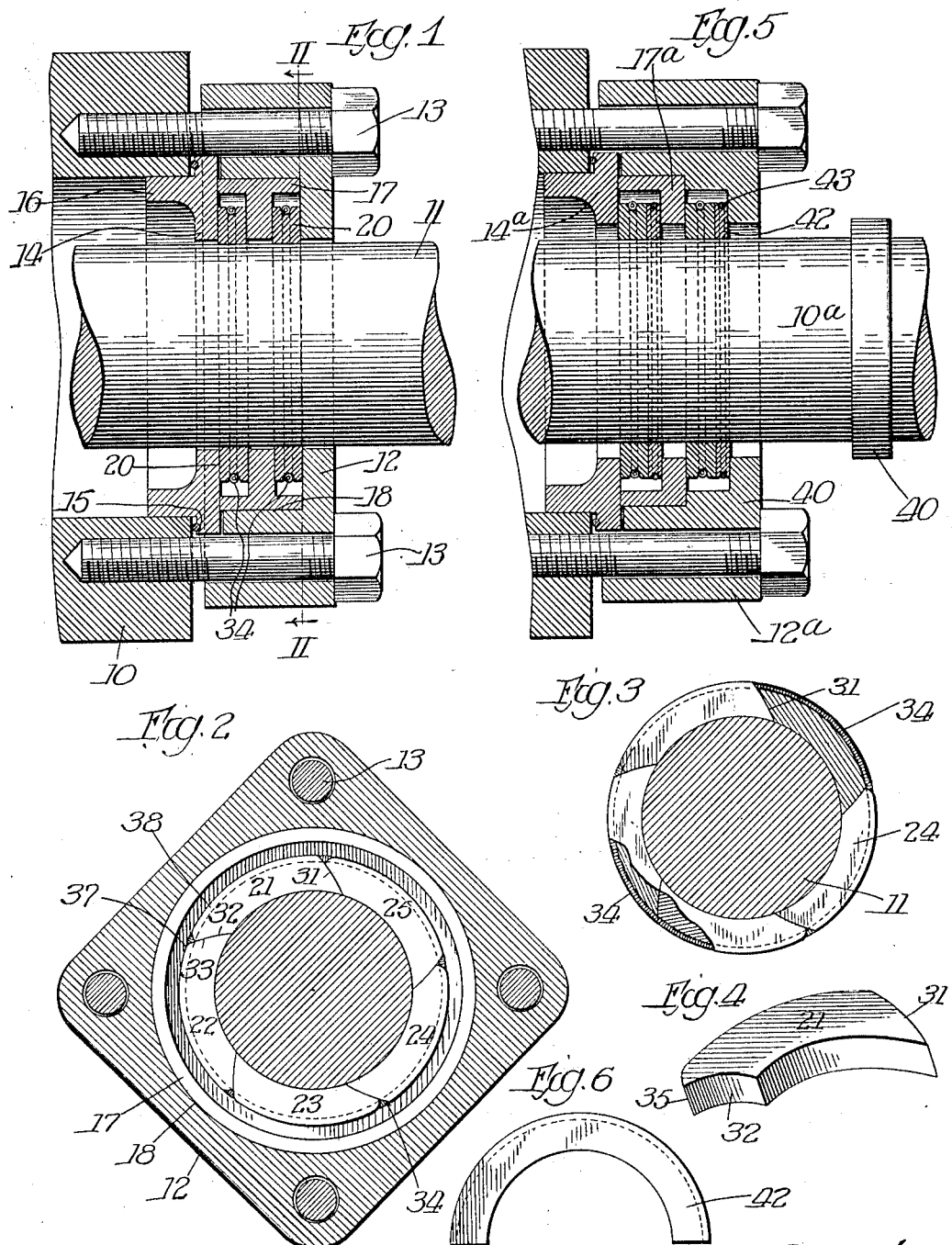

ANTON CHRISTENSON, OF AURORA, ILLINOIS, ASSIGNOR TO AURORA METAL COMPANY, OF AURORA, ILLINOIS, A CORPORATION OF ILLINOIS.

METALLIC PACKING.

1,048,657.  Specification of Letters Patent.  Patented Dec. 31, 1912.

Application filed June 2, 1911. Serial No. 630,926.

*To all whom it may concern:*

Be it known that I, ANTON CHRISTENSON, a citizen of the United States, and a resident of Aurora, in the county of Kane and State of Illinois, have invented certain new and useful Improvements in Metallic Packing, of which the following is a specification.

My present invention relates to metallic packing in general, and more particularly to metallic packing for shafts, piston rods, valve stems and the like, and has special reference to the provision of an improved form of packing wherein the members are elastically retained in operative relation to each other.

The principal objects of my invention are the provision of a metallic packing wherein the segments will better coöperate in making a tight joint, and wear more evenly than others known to me; wherein the opposing faces of the segments may be contacting and co-acting plain surfaces; wherein no tongue and groove or like engaging surfaces are required for the efficient operation of the device; wherein the segments are similitudes; the provision of an improved packing wherein the lines of contact of the segments are arranged at an angle to the radii of the shaft or rod with which the packing is intended for use, whereby I secure an iris-like movement of the segments as they wear in service; and wherein such lines of contact are substantially arcs whose radii are chords of other arcs formed by inscribing in a circle of the same diameter as such rod or shaft, an equilateral polygon whose sides are equal in number to the number of segments forming the packing; together with such further objects as may hereinafter appear.

In attaining the foregoing objects, together with certain benefits and advantages to be below disclosed, I have provided the constructions illustrated in the accompanying drawings, wherein—

Figure 1 is a longitudinal vertical section showing a portion of a cylinder head and piston rod, having my improved packing applied thereto, and illustrating one embodiment of my invention; Fig. 2 is a vertical section taken on the line II—II of Fig. 1, illustrating in elevation one of the packing rings applied for use; Fig. 3 is a plan view, partly broken away, illustrative of the elastic means for holding the segments in operative position about a piston rod; Fig. 4 is a perspective view showing one of the segments of the packing; Fig. 5 is a view illustrative of another embodiment of my invention, and Fig. 6 is a detailed face view of one of the parts shown in section in Fig. 5.

On inspection of Figs. 1 to 4 of the drawing, it will be apparent that I have here shown my invention as embodied for use as a packing for locomotive piston rods, in which connection I find it especially useful, though obviously it is largely useful for many other purposes.

Referring more particularly to Fig. 1 it will be noted that in the present construction, I have illustrated a cylinder head 10, a piston 11 reciprocable therein, and a gland 12 secured to the head 10 by the bolts 13, a packing head ring 14 being interposed between the gland and cylinder head, and a suitable packing, such as the wire 15 being interposed between the cylinder head 10 and the packing head 14, in order to secure a tight joint. To form a chamber to receive the metallic packing, and hold the packing as a whole in operative position, the packing head ring 14 is provided with a flange 16 fitted into the cylinder head 10, and the gland 12 is preferably of substantially a right angle form in cross section. For the purpose of separating the metallic packing rings from each other and forming a separate annular chamber for each of them I make use of a partition ring 17 fitted snugly against the inner surface of the gland 12 and clearing the piston rod 11.

The packing rings 20—20 are preferably substantial duplicates in all essential particulars, so the description of one of them will answer present purposes. On viewing Fig. 2 it will be observed that the several segments of the ring 20 are substantial duplicates, and that I have here shown such rings as being formed of five segments, 21, 22, 23, 24 and 25, each segment, as 21 being convex at one end as indicated at 31 and concave at the opposite end, as indicated at 32, to accommodate the convexity 33 of the next adjacent or abutting segment, as 22, the several segments being held together by an elastic member such as the coiled spring 34 fitting in the groove 35. In order to most efficiently compensate for wear of the segments and permit them, as it were, to contract or come together, I find it desirable that the line of abutment between the adjacent segments, such as 21, 22, be an arc of a circle whose radius is a chord of an arc ascertained by inscribing in a circle substantially equal to that of the rod or shaft for which the packing is to be used, an equilateral polygon whose sides are equal in number, preferably, to the number of segments forming the packing, and taking one of the sides of such polygon as the radius for such arc. Thus in the present instance where I have shown five segments, I inscribe the pentagon and take the length of one of the sides of the pentagon as the radius for the arc 36—37. Obviously the number of segments will depend somewhat upon the size of the packing, though I find that no number less than three may be efficiently used, and in order to avoid tendency toward undue wear on the spring 34 or wedging of any one of the segments in the event that it should ride upward and outward upon the next adjacent segment, I preferably round off the outer corner of each concave portion as indicated at 38.

Referring now more particularly to Figs. 5 and 6 it will be observed that in the construction here illustrated, to enable the passage through the gland of a piston 10ª having a collar 40, the partition ring 17ª is made of substantially a right angle form in cross section, and the gland 12ª is provided with an offset portion or shoulder 41, against which the partition ring abuts, and that the openings in the gland 12ª and packing head ring 14ª, as well as in the partition ring 17ª, are made large enough for the passage therethrough of the collar 40. In this modified form of construction I found it convenient to employ the supplemental abutment rings 42, preferably made of two segments and held together by an elastic member such as a coiled spring 43, in order to prevent canting or lateral displacement of the segments 21 to 25.

Having thus described my invention and illustrated its use, what I claim as new and desire to secure by Letters Patent, is the following:

1. In a metallic packing for piston rods, the combination with a cylinder head having a packing head ring, a piston rod, and a gland, of a metallic segmental packing ring in the form of a pentagon, of radially movable segments having abutting surfaces arranged at an angle to the radii of the rod, the radius for the arc being the length of one side of said pentagon, each segment being curved in one direction and plain transversely thereof; the outer corner of one end of each segment being rounded off.

2. In a metallic packing for piston rods, the combination with a cylinder head having a packing head ring, a piston rod and a gland, of a metallic segmental packing ring comprising a plurality of radially movable segments having abutting surfaces arranged at an angle to the radii of said rod curved in one direction and plain transversely thereof, the contacting lines of said segments being arcs whose radii are substantially equal to the sides of an equilateral polygon inscribed in a circle equal to the circumference of the ring, said segments being readily adjustable and self-accommodatory, both axially and radially of the shaft as well centrifugally as centripetally without separation.

3. A metallic packing ring comprising, in combination, a ring of pentagonal form composed of a plurality of contacting segments, the lines of contact being arcs whose radii are substantially equal to sides of an equilateral polygon inscribed in a circle equal to the circumference of the ring, the said lines of contact being curved in one direction and plain transversely thereof.

In testimony whereof I have hereunto signed my name in the presence of the two subscribed witnesses.

ANTON CHRISTENSON.

Witnesses:
R. H. COLBY,
GUSTAV THURNAUER.

---

Copies of this patent may be obtained for five cents each, by addressing the "Commissioner of Patents, Washington, D. C."